United States Patent [19]

Kartchner et al.

[11] Patent Number: 4,638,494
[45] Date of Patent: Jan. 20, 1987

[54] SYSTEM FOR THE ACQUISITION OF CODE SIGNALS

[75] Inventors: Earl M. Kartchner, Salt Lake City, Utah; Robert Price, Lexington, Mass.; Gary R. Van Horn, Salt Lake City, Utah

[73] Assignee: Sperry Corporation, New York, N.Y.

[21] Appl. No.: 65,040

[22] Filed: Aug. 19, 1970

[51] Int. Cl.⁴ ............................................. H04K 1/08
[52] U.S. Cl. ..................................... 375/2.2; 375/2.1; 178/22.15; 178/22.19; 455/26
[58] Field of Search ...................... 325/32; 179/1.5 R; 178/22, 22.15, 22.19; 343/6.5 LC; 340/345; 455/26, 29; 375/1, 2.1, 2.2

[56] References Cited

PUBLICATIONS

*Digital Communications with Space Applications,* Prentiss Hall, 1964, pp. 87–103, by Mahlon F. Easterling.
*A Comparison of Binary Delay–Lock Tracking–Loop Implementations* by Walter J. Gill, "IEEE Transactions on Aerospace and Electronic Systems," vol. AES2, No. 4, Jul. 1966, pp. 415–425.

*Primary Examiner*—Benjamin A. Borchelt
*Attorney, Agent, or Firm*—Howard P. Terry; Albert B. Cooper

[57] ABSTRACT

A system for the secure and rapid acquisition of a transmitted acquisition composite code composed from acquisition component codes. The acquisition composite code may, for example, be composed in accordance with a Boolean majority voting rule. Reference component codes that correlate respectively with the acquisition component codes are combined to provide a verification composite code that correlates with the acquisition composite code only when all of the reference component codes in the verification code are each in alignment with the corresponding acquisition component codes in the acquisition composite code. The verification code may, for example, be composed in accordance with a modulo-2 addition rule. Initially, the reference component codes are individually brought into alignment with the transmitted signal during the acquisition thereof. The verification code is then cross-correlated against the acquired transmitted signal to verify the successful acquisition of the transmitted acquisition composite code.

23 Claims, 4 Drawing Figures

SYSTEM FOR THE ACQUISITION OF CODE SIGNALS

BACKGROUND OF THE INVENTION

1. Field of the Invention

The invention pertains to the rapid acquisition of composite code signals and particularly to the secure acquisition thereof. The invention is particularly adaptable for use in spread spectrum communication systems.

2. Description of the Prior Art

Composite codes have been utilized, for example, in systems for obtaining the range of an object such as a space vehicle with respect to a base transmitter or for providing a data communication function in systems, for example, of the spread spectrum transmission type. Such ranging systems are described in the IEEE Transactions on Aerospace and Electronic Systems, Volume AES-3, No. 1, January 1967, "Designing Pseudo-Random Coded Ranging Systems" by John H. Painter, page 14 as well as in the JPL Research Summary, No. 36-10, "Commmunications Research" by M. F. Easterling et al., page 26.

Composite codes for use in such systems may be composed from component codes in accordance with a variety of composition rules. For example, the component codes may be binary state codes which are combined in accordance with a Boolean majority voting rule whereby a bit in the composite code is binary ZERO when half or more of the corresponding bits of the component codes are ZERO, and is binary ONE if more than half of the corresponding bits of the component codes are ONE.

As is well known, composite codes have been utilized in systems of the type described for rapid signal acquisition where acquisition is understood to mean the alignment of a reference code with the transmitted acquisition code until the peak of the correlation function therebetween is attained, as explained in the above-cited references. The correlation signal may then be utilized to adjust the system timing to track the acquisition code thereby remaining locked thereto.

The acquisition composite code may be rapidly acquired by first aligning one of the component codes with the received signal. The alignment is achieved by continuously adjusting the phase of the one component code until the peak of the correlation function between the component code and the received signal is attained. Since all of the component codes are maintained in bit synchronism and are simultaneously swept in-phase with each other during the alignment of the first component code, all of the component codes are positioned in bit alignment with the received code, that is, with the boundaries between bits in each code occurring in synchronism. If the acquisition code is of a type whereby all of the component codes correlate at least partially therewith, the remaining component codes may be aligned with the acquisition code by stepping each code sequence one bit position at a time past the received code until the respective correlation peaks are attained. This particular rapid acquisition procedure is well known and is described in detail in the above-cited references.

Two known composite codes suitable for rapid acquisition are the majority voting code described above and a three component code composed by forming the modulo-2 sum of one of the component codes with the logical AND combination, or logical product, of the remaining two codes. These codes are suitable for rapid acquisition in both ranging and data communication systems. The component and composite codes utilized may, for example, be pseudo-random codes.

A problem existent in such ranging systems is the false acquisition of a signal by accidental mistiming with respect to one or more of the component codes or by a deliberate analytical jamming or spoofing by an enemy device transmitting one of the component codes at a significantly higher signal strength than that of the corresponding component in the desired signal. The ranging system would thus lock onto the enemy transmitter providing false and misleading range information.

In data communication systems, particularly of the covert variety, where the acquisition composite code signal may be modulated by data, the system may be subject to accidental mistiming and deliberate jamming or spoofing as discussed above thus preventing the transmission of vital data or causing the receipt of false information transmitted by the enemy device.

A further disadvantage of these prior systems is that they may be subject to repeat jamming. Repeat jamming is the immediate retransmission, by an enemy device, of the signal to be acquired but at a substantially higher signal strength than that of the friendly transmission. The friendly receiver may lock onto the enemy transmitter by reason of sidelobes of the correlation function between the composite codes utilized.

SUMMARY OF THE INVENTION

The present invention obviates the disadvantages discussed above by the discovery that verification composite codes may be generated from reference component codes that correlate respectively with the acquisition component sequences comprising the acquisition composite codes, where the cross-correlation functions between these verification codes and the acquisition composite codes have single, unique correlation peaks of substantial magnitude. Thus, a verification composite code can be utilized to confirm the successful acquisition of an acquisition composite code. One such verification composite code is the modulo-2 sum of the reference component sequences. A unique property of this verification code is that only when all of the reference component sequences thereof are each in alignment with all of the corresponding acquisition sequences in the transmitted acquisition code is substantial correlation therebetween attained. A further useful property of this verification code is that none of its reference component sequences alone, or of any combination of fewer than all of them, will correlate therewith.

The present invention will be described in terms of a data communication system utilizing a conventional rapid acquisition composite code for locking onto the transmitter. The modulo-2 sum of the reference component sequences is utilized at the receiver to provide the verification composite code that is cross-correlated against the acquired signal to verify the successful acquisition of the acquisition composite code. The transmitter, to which the receiver is now synchronized, may then transmit the verification composite code modulated by data, to perform the communication function and also greatly increase the difficulty of signal analysis by an enemy. Since none of the reference component codes alone nor any combination of fewer than all of them correlates with the verification composite sequence, an intelligent jammer must have knowledge of all of the reference component codes and their phase relationships with respect to each other in order to jam the data transmission. Additionally, since the cross-correlation function between the verification composite code and the acquisition composite code has negligible sidelobes relative to the correlation peak, and since any repeat jamming by an enemy device must arrive at the receiver delayed relative to the desired signal, acquisition of the desired signal can be verified in the presence of repeat jamming by ascertaining that no earlier verification code timing yields a significant correlation peak.

BRIEF DESCRIPTION OF THE DRAWINGS

FIG. 1a illustrates the transmitting system, and FIG. 1b illustrates the receiving system; FIG. 2a illustrates the transmitting system, and FIG. 2b illustrates the receiving system.

DESCRIPTION OF THE PREFERRED EMBODIMENTS

Figure 1A:
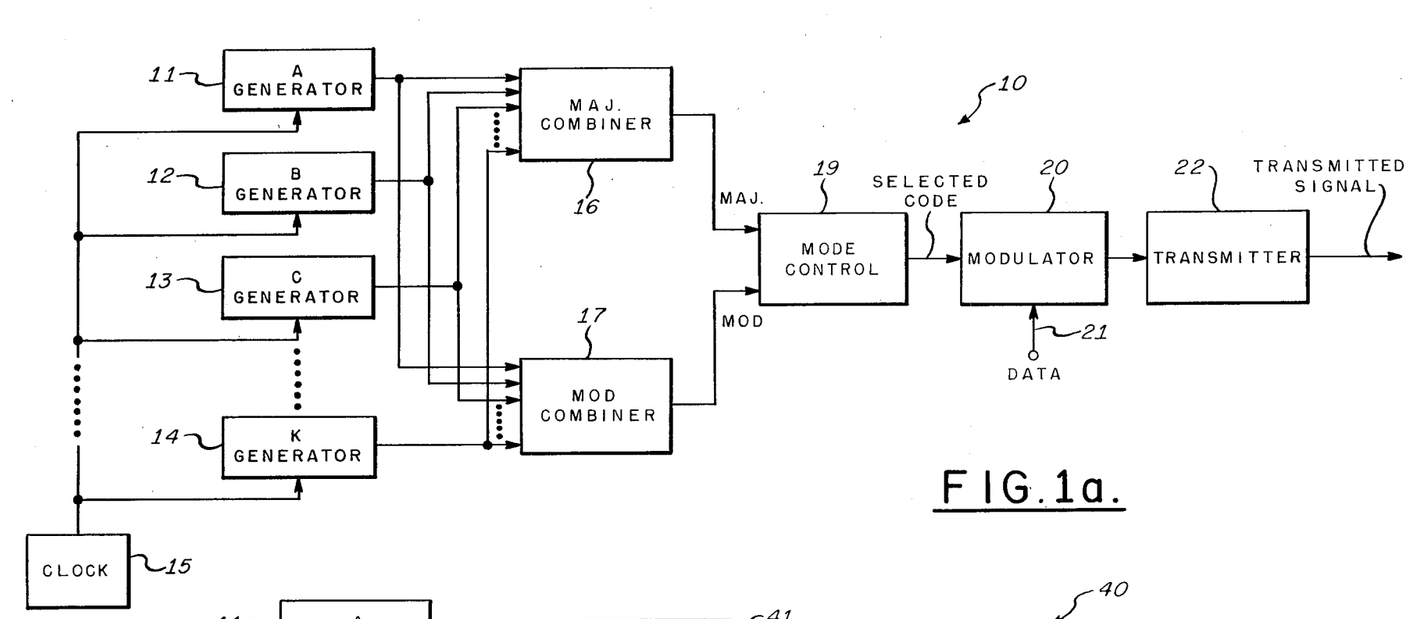
FIGS. 1a & b are a block schematic diagram of an embodiment of a data communication system in accordance with the teachings of the present invention where

Referring to FIG. 1, a data communication system embodying the principles of the present invention is illustrated of which FIG. 1a depicts the data transmitting portion 10 thereof. The data transmitting system 10 includes acquisition component code generators 11 through 14. The acquisition component code generators 11 through 14 provide acquisition component codes which may, for example, be binary state pseudo-random codes. Ideally, the codes should possess the following properties:

1. the cyclic lengths of the codes should be relatively prime with respect to each other;
2. The codes should possess substantially ideal auto-correlation functions; and
3. the codes should be balanced, i.e., each cycle should include approximately equal numbers of binary ONES and ZEROES.

The cyclic code lengths are said to be relatively prime with respect to each other if there exists no integer other than unity that divides more than one of the respective lengths of the codes, that is, they have no common factors. An auto-correlation function is said to be ideal when it possesses a correlation peak of substantial magnitude and has no significant sidelobes. The acquisition code generators 11 through 14 may be of the conventional shift register type that provides pseudo-random codes of the linear maximal length variety.

A clock source 15 provides the timing signals for the acquisition component code generators 11 through 14 such that all of the codes are provided at the same clock rate and have the same bit intervals in time. It is understood that the relative bit phases of the codes provided by the generators 11 through 14 may be adjusted by means that, for the sake of clarity, are not shown here.

The pseudo-random binary codes provided by the component code generators 11 through 14 are applied as inputs to a MAJ combiner 16. The MAJ combiner 16 combines the bits of the codes in accordance with a conventional Boolean majority logic voting rule thereby providing a composite code hereinafter referred to as the MAJ composite code for convenience.

The output of the MAJ combining circuit 16 is a binary ZERO during a bit interval if, in the bit interval, half or more than half of the component codes are binary ZERO. The output of the MAJ combining circuit 16 is binary ONE during the bit interval if more than half of the component codes are binary ONE. An alternative majority voting rule may be utilized where the MAJ output is ZERO when more than half of the component codes are ZERO and is ONE when half or more than half of the component codes are ONE. The MAJ composite code may be utilized as an acquisition composite code for reasons and in a manner to be described. It is understood that the MAJ combining circuit 16 may comprise conventional binary majority voting circuits of a type well known in the digital electronics art.

As well as being provided as inputs to the MAJ combiner 16, the pseudo-random binary acquisition component codes provided by the acquisition component code generators 11 through 14 are also applied as inputs to a MOD combiner 17. The MOD combining circuit 17 generates the modulo-2 sum of the bits of the codes provided thereto during each bit interval. The MOD output is ZERO when the number of binary ONES being summed in a bit interval is even and the MOD output is ONE when the number of binary ONES being summed in a bit interval is odd. The composite code provided by the MOD combiner 17 will hereinafter be designated as the MOD composite code for convenience. It is understood that the MOD combining circuit 17 may comprise a conventional binary arithmetic circuit of a type well known in the digital electronics art. The MOD composite code may be utilized as a verification composite code or as a data carrier composite code for reasons and in a manner to be described.

The MAJ and MOD signals from the combining circuits 16 and 17, respectively, are applied as inputs to a mode control circuit 19. The mode control circuit 19 provides as its output either the MAJ code or the MOD code selected in accordance with the mode in which the system is operating. The selected code from the mode control circuit 19 is applied as an input to a modulator 20. An input 21 to the modulator 20 provides a data signal which may modulate the selected code in any convenient manner.

The selected code passing through the modulator is applied as an input to a transmitter 22. The transmitter 22 may provide the selected code for transmission in a conventional manner. For example, if binary data modulates the selected code by modulo-2 addition, then the transmitter 22 may generate an RF carrier signal which is phase-switched in accordance with the binary state modulated code resulting therefrom. The output provided by the transmitting circuit 22 is transmitted to be received by a receiving system 26 illustrated in FIG. 1b.

Figure 1B:
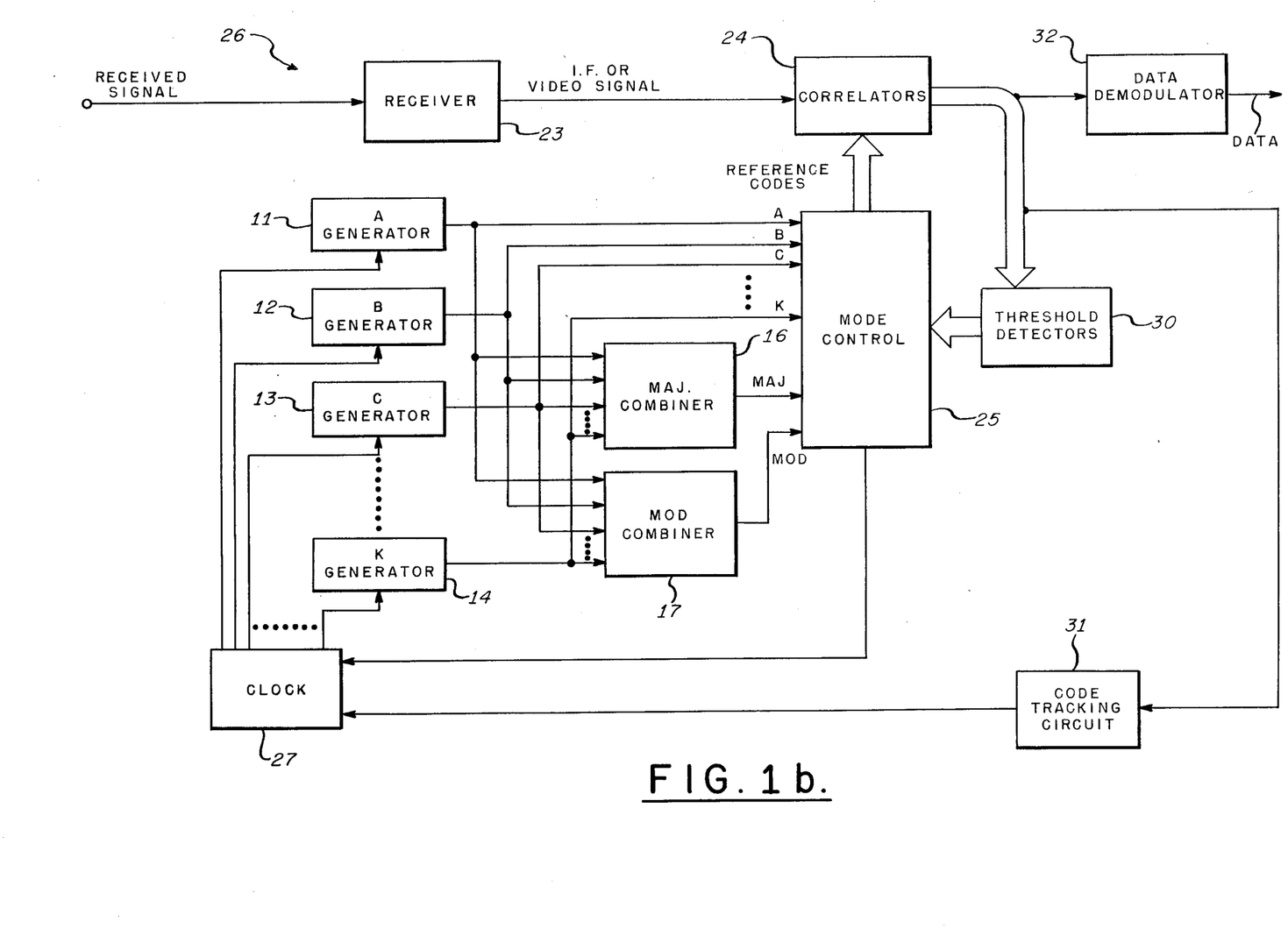

Referring now to FIG. 1b, in which like reference numerals indicate like components with respect to FIG. 1a, the signal provided by the transmitting system 10 is received by a conventional receiver 23. The receiver 23 processes the received signal in a conventional manner thereby providing an I.F. or video signal representative thereof. The I.F. or video signal from the receiver 23 is provided as a common input to a number of correlation circuits 24. The correlation circuits 24 may include a plurality of conventional correlators each of which may comprise, for example, an active correlation circuit. The conventional active correlator may comprise a multiplier coupled to an integrator when operating on a video signal or a mixer coupled to a narrow bandwith filter when operating on an I.F. signal. The other inputs to the active correlators 24 are applied from a mode control circuit 25 which provides reference codes thereto in a manner to be explained. Alternatively, one or more of the correlators may be implemented in a known manner by utilizing passive matched filters whose inpulse responses are replicas of reference code signals.

The receiving system 26 includes reference component code generators 11 through 14. The reference component code generators 11 through 14 may be identical to the similarly numbered acquisition component code generators of FIG. 1a. Although the invention will be explained in terms of the reference component code generators and the acquisition component code generators providing identically the same codes respectively, for convenience and optimum performance, it is to be understood that the reference component codes need only correlate with the acquisition component codes respectively, although they need not be identical therewith to practice the invention. The reference component code generators 11 through 14 are driven from a clock source 27. The clock source 27 provides clock signals to the code generators 11 through 14 respectively so that the codes are provided at the same clock rate with respect to each other and have identical bit intervals. The clock source 27 in addition includes circuits to continuously and simultaneously adjust the phases of the clock signals provided to the generators 11 through 14 so that the codes generated thereby may together be slipped in time. The clock source 27 may in addition include circuits to delete, one at a time, clock pulses from any one of the clock signals going to the component code generators so that the code provided by the generator associated therewith may be stepped one bit interval at a time past the received signal for reasons to be discussed. The clock source 27 receives a signal from the mode control circuit 25 to control the described functions in a manner to be explained. The circuits of the clock source 27 may be of any conventional design of a type well known to those skilled in the art.

The pseudo-random binary codes provided by the code generators 11 through 14 are combined in the MAJ and MOD combining circuits 16 and 17 in a manner identical to that described with respect to FIG. 1a thus providing the MAJ and MOD reference composite codes respectively.

In addition to providing the MAJ and MOD composite codes as described, the code generators 11 through 14 provide the individually generator reference component pseudo-random codes designated as codes A-K respectively.

The individual reference component codes A-K as well as the MAJ and MOD composite codes are provided as inputs to the mode control circuit 25. The mode control circuit 25 selects, in a conventional manner, one or more of the codes for application to the correlators 24, for reasons to be explained. The mode control circuit 25 in addition selects the particular correlators in the correlation circuits 24 to be utilized in accordance with the operational mode of the receiving system 26.

The outputs of the correlators 24 are applied as inputs to respective threshold detectors 30. The threshold detectors 30 are conventional circuits that provide signals, respectively, whenever the respectively applied correlation signals exceed respective predetermined thresholds. The outputs of the threshold detectors 30 are applied as inputs to the mode control circuit 25 for reasons to be discussed.

The output signal from one of the correlators 24, selected by the mode control circuit 25 is provided as an input to a code tracking circuit 31. The code tracking circuit 31 is utilized to track the peak of the correlation function provided by the selected correlator. The code tracking circuit 31 may comprise a conventional phase locked loop which may conveniently be instrumented as a dither modulator/demodulator of a conventional type. The output of the code tracking circuit 31 is applied as an input to the clock source 27 to adjust the phases of the clock signals for the purpose of tracking the correlation peaks during the various operational modes of the system, in a manner to be described.

The output of the same or another selected one of the correlators 24 is also applied as an input to a data demodulator 32. The data demodulator 32 is a conventional circuit that demodulates the data modulated code carrier signal, thereby providing a signal representative of the information impressed on the code carrier by the modulator 20 of FIG. 1a.

Figure 2A:
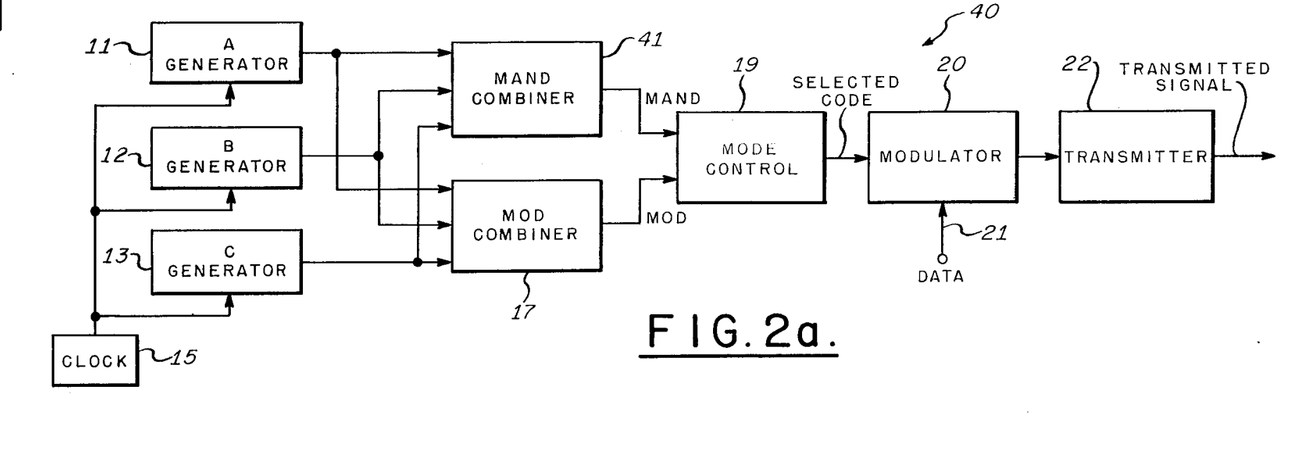
FIGS. 2a & b are a block schematic diagram of another embodiment of a data communication system in accordance with the teachings of the present invention where

Referring now to FIG. 2a, in which like reference numerals indicate like components with respect to FIG. 1a, a transmitting system 40, instrumented in accordance with the present invention, is illustrated. The transmitting system 40 is substantially the same as the transmitting system 10 of FIG. 1a except that a MAND combiner 41 responsive to three pseudo-random binary acquisition component codes is utilized instead of the MAJ combiner 16. The code sequence provides by the MAND combining circuit 41 will hereinafter be referred to as the MAND composite code for convenience. The MAND composite code is composed from the three component code sequences by generating the modulo-2 sum of the sequence provided by the code generator 11 with the Boolean AND, or logical product, combination of the sequences provided by the code generators 12 and 13. The MAND code may be expressed as $$MAND = A \oplus BC$$

where $\oplus$ represents modulo-2 addition and BC is the logical product of B and C. The logical operations expressed thereby are performed during each bit interval on the respective bits of the component codes A, B and C. The MAND composite code may be utilized as an acquisition composite code for reasons and in a manner to be described. The MAND composite code provides advantages with respect to the MAJ composite code of a nature to be clarified hereinafter. It is understood that the MAND combining circuit 41 may comprise a conventional binary logic circuit of a type well known in the digital electronics art.

Figure 2B:
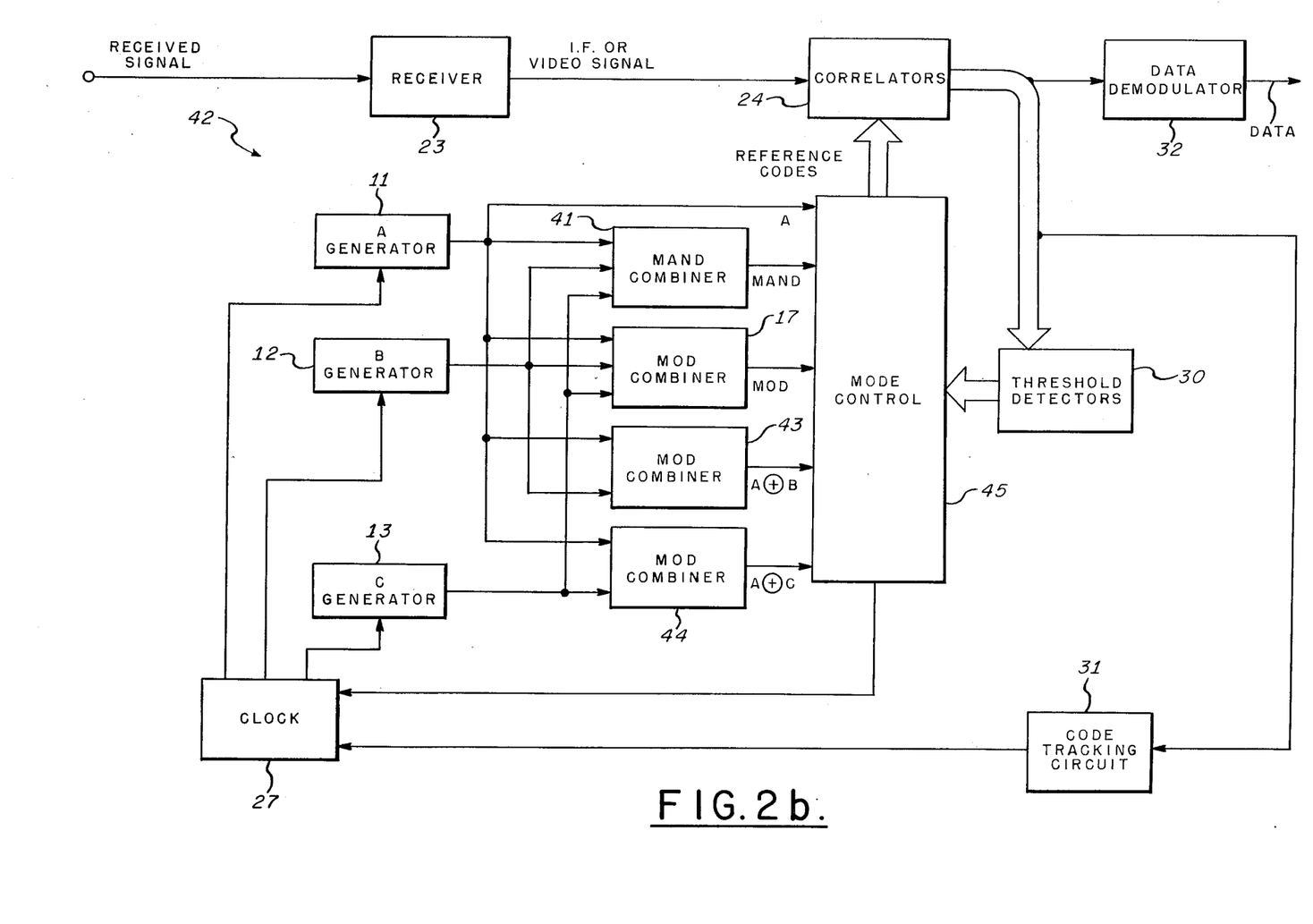

The MAND or MOD code selected by the mode control circuit 19 is transmitted by the transmitter 22 in a manner similar to that described with respect to FIG. 1a. The signal provided by the transmitting system 40 is received by a receiving system 42 which is illustrated in FIG. 2b. The receiving system 42 is similar to the receiving system 26 previously described with respect to FIG. 1b.

Referring now to FIG. 2b, in which like reference numerals indicate like components with respect to FIGS. 1b and 2a, the receiving system 42 functions in a manner identical to that described with respect to the receiving system 26 of FIG. 1b except that the MAND combiner 41 is utilized instead of the MAJ combining circuit 16. In addition, MOD combining circuits 43 and 44 are included for reasons to be discussed. The MOD combining circuit 43 is responsive to the reference component codes provided by the code generators 11 and 12 thus providing the modulo-2 sum thereof to be utilized as a reference composite code. In a similar manner, the MOD combiner 44 provides the modulo-2 sum of the codes generated by the code generators 11 and 13.

A mode control circuit 45 coupled to receive the signals from the component code generator 11, the MAND combiner 41 and the MOD combiners 17, 43 and 44 provides signals to the selected correlators 24 and to the clock source 27 in a manner similar to that described with respect to the mode control circuit 25 of FIG. 1b.

Before the operation of the apparatus illustrated in FIGS. 1 and 2 is discussed, it will first be necessary to describe the pertinent properties of the MAJ, MAND and MOD composite codes with respect to the component codes of which they are composed and with respect to each other. The MAJ composite code has a cross-correlation function with respect to each of its component codes having correlation peaks of substantial magnitude and sidelobes of negligible magnitude. The cross-correlation function of the MAND code (A ⊕ BC) and its A-component has a correlation peak of substantial magnitude and sidelobes of negligible magnitude. The cross-correlation functions of A ⊕ B with MAND and A ⊕ C with MAND have similar properties with respect to B and C when the A-component of A ⊕ B and A ⊕ C is aligned with the A-component of MAND. The respective cross-correlation functions of the component codes with the MOD composite code do not have any significant correlation peaks. The MOD composite code has correlation functions with respect to the MAJ and MAND composite codes that have respective correlation peaks of substantial magnitude and sidelobes of negligible magnitude. The correlation peaks occur only when all respective component codes are aligned. This is in contrast to the auto-correlation functions of MAJ and MAND, which have large sidelobes.

In the operation of the data communication system illustrated in FIG. 1, the acquisition mode will first be discussed. The acquisition component code generators 11 through 14 of FIG. 1a are set to generate respective predetermined codes and the relative phases thereof are adjusted in accordance with a predetermined pattern. It may be appreciated that the acquisition component codes and their relative phases may be changed at prearranged times for securiy purposes. The mode control 19 is adjusted to select the MAJ composite code for transmission by the transmitter 22. With suitable arrangement of the receiver threshold detector circuitry 30, the data modulator 20 can be permitted to operate during the acquisition mode, but successful data communications will normally commence only when acquisition has been accomplished and verified.

The receiving system 26 of FIG. 1b receives the signal transmitted by the transmitting system 10, the signals transmitted by enemy devices and noise signals. The reference coponent code generators 11 through 14 of the receiving system 26 are adjusted to generate identically the same respective code patterns as the corresponding acquisition component code generators of the transmitting system 10. The mode control 25 selects one of the reference component codes, for example the A-code, for application to a selected correlator of the correlation circuits 24 for correlation matching with the received signal. The mode control 25 controls the clock source 27 so that the phase of the A-component code is continuously swept past the received signal until the selected correlator of the circuits 24 indicates a correlation peak by means of the associated threshold detector of the circuits 30. The mode control 25, in response to the detected correlation peak, stops the time sweep of the A-code. The output of the selected correlator is utilized, via the code tracking circuit 31, to maintain the proper adjustment of the clock 27 so that the correlation peak of the A-code with respect to the incoming signal is tracked. Thus, the code tracking circuit 31 locks onto the peak of this correlation function adjusting the clock 27 to maintain the A-reference component code aligned with the incoming signal. Since the remaining codes are generated in bit synchronism with the A-code, the remaining codes are now in bit synchronism with the incoming signal although not necessarily aligned at their respective correlation peaks. The A-reference component code has now been acquired with respect to the received signal.

The mode control circuit 25 now selects a second correlator of the correlation circuits 24 and applies a second reference component code, for example the B-code, thereto for correlation with the received signal. The B-clock is stepped one bit at a time until the selected correlator manifests a correlation peak as detected by the associated threshold detector 30. The mode control circuit 25 then stops the stepping of the B-clock.

The remaining codes are aligned with the received signal in a similar manner while the correlation peak resulting from the alignment of the A-code with the received signal maintains the proper adjustment of the clock 27 via the code tracking circuit 31.

It may be appreciated that the correlators of the correlation circuits 24 may be of a conventional design wherein a +1 voltage is provided when the bits applied thereto are the same with respect to each other, i.e., either both binary ZERO or both binary ONE, or a −1 voltage when the applied bits are different with respect to each other.

It may further be appreciated that if acquisition time is to be minimized, sufficient correlators may be included in the circuits 24 so that alignment of the reference component codes with the received signal can be achieved in parallel operation. Initially, all of the reference component codes are swept continuously past the incoming code. The first correlator to detect a correlation peak is switched, by the mode control circuit 25, to drive the code tracking circuit 31. Thereafter, the remaining codes are simultaneously stepped one bit at a time past the incoming code. As the respective codes become aligned with the incoming signal, the stepping operations of the corresponding clock signals are stopped. In this manner, all of the reference component code may be rapidly aligned with the incoming signal.

As previously explained, the receiving system 26 tracks the received signal via the cross-correlation function of the A-reference component code therewith. It should be noted that the peak of this correlation function may be substantially less than unity with respect to the auto-correlation function of the MAJ composite code. In order to increase the tracking signal strength of the system after all of the reference component codes have been acquired, the mode control 25 may apply the output of the MAJ combiner 16 to a correlator of the correlation circuits 24 in order to track the incoming signal via the code tracking circuit 31 and the clock source 27. Since the auto-correlation function of the MAJ reference composite code provided by the MAJ combiner 16 with respect to the MAJ acquisition composite code transmitted by the transmitting system 10 has a normalized correlation peak of unity when the reference component codes are in proper alignment, the tracking signal strength of the system is enhanced.

It may now be appreciated that, after apparent acquisition, one or more of the reference component codes provided by the generators 11 through 14 of FIG. 1b may be misaligned with respect to their component code counterparts in the received signal. Such misalignment may occur because, for example, of correlation with noise signals during the acquisition procedure. Similarly, the apparatus may have been "spoofed" by an intelligent jammer that had knowledge of one or more of the reference component codes utilized by the system with the result that one or more of the reference component code generators 11 through 14 may have mistakenly locked onto the enemy transmitter. It may be appreciated that although accidental mistiming or deliberate spoofing may have occurred, the MAJ-referenced correlator of the correlation circuits 24 may still provide a substantial correlation peak because of the significant auto-correlation sidelobes of the MAJ code. It is to be understood that if misalignment or spoofing has occurred the system, at this time, is unaware of it.

In order to verify the successful acquisition of the MAJ acquisition composite code transmitted by the transmitting system 10, the mode control circuit 25 of the receiving system 26 applies the output of the MOD combiner 17 to a selected correlator of the circuits 24 for correlation with the incoming signal. Only if all of the reference component codes provided by the generators 11 through 14 of the receiving system 26 are in proper alignment with the respective acquisition component codes of the transmitted MAJ composite signal, will the selected MOD-referenced correlator provide a correlation peak. If any one of the reference component codes is misaligned with respect to its counterpart in the incoming signal, the selected verification correlator will provide essentially zero output. It may thus be appreciated that the successful acquisition of the transmitted MAJ code may be verified by this procedure in accordance with the present invention and remedial action taken if mistiming or spoofing is detected. For example, the timing of the individual reference component codes may be readjusted so as to search until the proper verification is obtained.

When successful acquisition has been verified, the mode control circuit 19 of the transmitting system 10 may be adjusted to select the MOD composite code for transmission by the transmitter 22. The MOD code signal may function as a carrier for the data to be impressed thereon via the data input 21. For example, the data may be combined with the MOD carrier by modulo-2 addition of DATA and MOD or by frequency modulation of the RF carrier utilized to transmit the code signals.

Since the receiving system 26 is now in proper alignment with the transmitting system 10, the output of the MOD-referenced correlator of the receiving system 26 may now be utilized to track the incoming signal. The data carried by the transmitted MOD signal may be removed from the carrier by the data demodulator 32 for utilization in apparatus not shown.

The data communication system illustrated in FIG. 1 may be so arranged that the transmitting system 10 periodically reverts from the data mode to the acquisition mode so that acquisition may be maintained or re-established if accidentally lost. Also, it is possible to change the reference component codes periodically for the purpose of security, without need for reacquisition. Alternatively, a duplex communication system may be utilized wherein a second transmitter associated with the receiving system 26 may signal the transmitting system 10 when successful acquisition is achieved. A second receiving system may be associated with the transmitting system 10 to receive the signals provided by the second transmitter. Thus, two-way data communication and cooperative mode switching may be realized if desired.

It may be appreciated that since the MAJ acquisition composite code correlates with the MOD verification code, the transmitting system 10 may utilize the MAJ code for the purpose of data transmission although with some loss of tracking signal strength in the receiving system 26. It is appreciated that the MAJ code may be utilized in the data mode in circumstances where two-way communication is not practical and the ability to reacquire rapidly and verify at any time is necessary.

It may now be understood that in the data mode where either the MOD or MAJ composite code is utilized as the data carrier for the transmitting system 10 and the MOD composite code is utilized as the tracking code for the receiving system 26, the communication system is substantially immune from jamming since the MOD code does not correlate with any of its individual component codes as previously discussed. Thus, an intelligent jammer would need knowledge of all of the component codes being utilized and their timing in order to jam the system.

The operation of the data communication system illustrated in FIG. 2 is similar to that of the previously described system of FIG. 1 except that the MAND acquisition composite code is utilized instead of the MAJ code where MAND=A $\oplus$ BC. The A-reference component code is aligned with the received signal in a manner similar to that described with respect to FIG. 1 and is utilized to track the incoming signal. The A $\oplus$ B signal provided by the MOD combiner 43 is then utilized to align the B-reference component code in a manner similar to that previously described with respect to FIG. 1. Similarly, the C-reference component code is aligned by utlizing the A $\oplus$ C signal provided by the MOD combiner 44.

The operation in the data mode of the data communication system illustrated in FIG. 2 is substantially the same as that described with respect to FIG. 1 and will not be repeated here for brevity. It may be appreciated, however, that the system of FIG. 2 offers an advantage over the system of FIG. 1 in that the acquisition mode is "shielded." Acquisition shielding occurs as a result of the requirement that the A-code must be acquired before either the B or C codes are acquired by reason of the properties of these codes previously discussed.

While the above-described preferred embodiments of the present invention have been explained in terms of active acquisition and verification, it may be appreciated that passive systems utilizing, for example, matched filters may be realized to the same effect. Matched filters such as those described in the article by G. L. Turin, "An Introduction to Matched Filters" appearing on pages 311-329 of the June 1960 Transactions on Information Theory of the IRE, Volume IT-6, may be utilized.

Matched filters having impulse responses associated with the acquisition component codes, respectively, may be coupled to receive the incoming acquisition composite code signal thereby providing pulse trains having inter-pulse periods related to the cyclic code lengths of the acquisition component codes, respectively. Since the acquisition component codes have cyclic code lengths that are relatively prime with respect to each other, pulses from all of the pulse trains will only be coincident at times occurring periodically in accordance with the cyclic code length of the acquisition composite code. In a passive system utilizing matched filters, acquisition is accomplished by the determination of such a coincidence time. A coincidence time may be calculated from the occurrence times of one or more pulses of the pulse-train output signals from each of the component matched filters. The acquisition calculation will be subject to error, however, if a component matched-filter output pulse is mistimed because the system has been spoofed or upset by noise as previously described.

Successful acquisition may be verified by including a matched filter having the impulse response associated with the verification composite code, for example the MOD code as previously discussed, coupled to receive the incoming acquisition composite code signal. Therefore, this verification matched filter provides the cross-correlation function between the transmitted acquisition composite code and a substantial portion of the verification composite code, thereby providing an output pulse signal occurring at a time related to the successful acquisition of the transmitted acquisition composite code. The time of the pulse from the verification code matched filter may be compared to the calculated time of occurrence of a coincidence of all the output pulses from the component code matched filters, to provide a signal representative of the successful acquisition of the transmitted acquisition composite code signal. If the output pulse from the verification code matched filter occurs at a time that is consistent with the calculated coincidence time, successful acquisition is verified thereby. Suppose, however, that one of the acquisition component codes should be received, for example, from an enemy transmitter providing a strong signal so that a strong output pulse occurs in the associated matched filter at a time different from the output pulse produced by that component code in the desired transmitted acquisition composite code. Then the calculated coincidence time based on the time of this strong pulse will be inconsistent with the observed time of the output pulse from the verification matched filter, and the verification signal will be representative of an unsuccessful acquisition.

The passive acquisition and verification system using matched filters may be utilized for ranging purposes since the pulse trains from the component code matched filters are representative of times of occurrence of the incoming signals, hence representative of range. The passive system may also be utilized for data transmission by inclusion of circuits associated with the data function as previously described with respect to the active system.

It should be appreciated that although the preferred embodiments of the present invention described above are explained in terms of the reference component codes being identical to the acquisition component codes, respectively, for optimum performance, embodiments of the invention may be realized where the reference component codes correlate with the acquisition component codes, respectively, although they may not be identical therewith. For example, the acquisition component codes may be distorted by noise injection at the transmitter for security purposes. Thus, the distorted acquisitions component codes at the transmitter and the reference component codes at the receiver will have substantially identical underlying code patterns respectively, hence preserving the necessary respective correlation therebetween. As a further example, component code sequences that are the bit inverses of a suitable set of component codes may also be utilized to provide the necessary correlation between the acquisition and reference component codes.

Although the preferred embodiments of the invention have been explained in terms of pseudo-random codes, it may be appreciated that other codes having the properties of possessing substantially ideal auto-correlation functions and being balanced, as previously discussed, may also be utilized in practicing the invention although they may not be categorized as pseudo-random.

It may be appreciated that the principles of the presentinvention herein described may be utilized to instrument a ranging system for use, for example, to determine interplanetary distances. An earth based system may transmit the acquisition code which may, in turn, be reflected by a space vehicle back to the transmitting station. The transmit time of the transmitted signal is representative of the range of the vehicle from the base station. In a similar manner, the space vehicle may acquire the transmitted signal thereafter retransmitting the signal back to the base station. It may be appreciated that this ranging system is part of the prior art and may be improved by by utilizing the verification composite code to instrument a system secure against mistiming or enemy spoofing, in accordance with the present invention.

The embodiment of FIGS. 2a and 2b has been explained in terms of 3 component MAND and MOD codes. It will be appreciated that a larger number of component codes may be utilized in instrumenting these composite codes. The MOD code would be constructed in the manner previously described with respect to FIG. 1 and the MAND code would be composed by generating the modulo-2 sum of the Boolean AND combinations of pairs of the component codes and any remaining unpaired component code.

While the invention has been described in its preferred embodiment, it is to be understood that the words which have been used are words of description rather than limitation and that any changes made within the purview of the appended claims may be made without departing from the true scope and spirit of the invention in its broader aspects.

We claim:

1. A system for the secure and rapid acquisition of a transmitted acquisition composite code signal composed from acquisition component codes in accordance with a first composition rule of such a character that at least one of said acquisition component codes correlates with said acquisition composite code comprising:

acquisition means responsive to said transmitted signal for acquiring said transmitted signal with respect to reference component codes that correlate with said acquisition component codes respectively thereby acquiring said transmitted signal in accordance with said acquisition composite code, and correlator means responsive to said acquired transmitted signal for obtaining the cross-correlation function of said acquired transmitted signal with respect to a verification composite code thereby providing a verification signal representative of the successful acquisition of said transmitted acquisition composite code signal, said verification composite code being structured from said reference component codes in accordance with a second composition rule of such a character that said verification composite code correlates with said acquisition composite code only when all of said reference component codes are aligned to correlate respectively with the corresponding acquisition component codes in said acquisition composite code.

2. A system for the secure and rapid acquisition of a transmitted acquisition composite code signal composed from acquisition component codes in accordance with a first composition rule of such a character that at least one of asid acquisition component codes correlates with said acquisition composite code comprising:

reference component code generation means for providing reference component codes that correlate with said acquisition component codes respectively, acquisition means responsive to said reference component codes and said transmited signal for acquiring said transmitted signal with respect to each of said reference component codes thereby acquiring said transmitted signal in accordance with said acquisition composite code, verification code generation means responsive to said reference component codes for providing a verification composite code signal composed therefrom in accordance with a second composition rule of such a character that said verification composite code correlates with said acquisition composite code only when all of said reference component codes are aligned to correlate respectively with the corresponding acquisition component codes in said acquisition composite code, and correlator means responsive to said verification composite code signal and said acquired transmitted signal for obtaining the cross-correlation therebetween, thereby providing a verification signal representative of the successful acquisition of said transmitted acquisition composite code signal.

3. A system of the character recited in claim 2 in which said reference component codes have identical code patterns to those of said acquisition component codes, respectively.

4. A system of the character recited in claim 2 in which
said acquisition component codes have respective cyclic code lengths relatively prime with respect to each other, and each said reference component code has the same cyclic code length as the acquisition component code corresponding thereto.

5. A system of the character recited in claim 2 in which said acquisition and reference component codes are pseudo-random codes having respective auto-correlation functions with sidelobes of small magnitude compared to the magnitudes of the respective correlation peaks.

6. A system of the character recited in claim 2 in which said verification code generation means comprises means for providing said verification composite code signal in accordance with said second composition rule whereby said reference component codes do not separately correlate with said verification composite code.

7. A system of the character recited in claim 2 in which said acquisition and reference component codes comprise binary state codes respectively, and said verification code generation means comprises means for providing said verification composite code signal in accordance with a modulo-2 addition rule whereby said verification composite code comprises the modulo-2 sum of said reference component codes.

8. A system of the character recited in claim 7 in which said first composition rule comprises Boolean majority voting whereby said acquisition composite code comprises a Boolean majority vote combination of said acquisition component codes.

9. A system of the character recited in claim 7 in which said first composition rule comprises the Boolean AND function and modulo-2 addition whereby said acquisition composite code comprises the modulo-2 sum of the Boolean AND combinations of pairs of said acquisition component codes and any remaining unpaired acquisition component code.

10. A system of the character recited in claim 7 in which said acquisition and reference component codes each have about equal numbers of binary ONES and binary ZEROES.

11. A system of the character recited in claim 8 in which
said acquisition component codes have respective cyclic code lengths relatively prime with respect to each other,
each said reference component code has the same cyclic length as the acquisition component code corresponding thereto,
said acquisition and reference component codes are pseudo-random codes having respective auto-correlation functions with sidelobes of small magnitude compared to the magnitudes of respective correlation peaks, and
said acquisition and reference component codes each have about equal numbers of binary ONES and binary ZEROES.

12. A system of the character recited in claim 9 in which
said acquisition component codes have respective cyclic code lengths relatively prime with respect to each other,
each said reference component code has the same cyclic code length as the acquisition component code corresponding thereto,
said acquisition and reference component code are pseudo-random codes having respective auto-correlation functions with sidelobes of small magnitude compared to the magnitudes of the respective correlation peaks, and
said acquisition and reference component codes each have about equal numbers of binary ONES and binary ZEROES.

13. A system of the character recited in claim 2 in which said acquisition means comprises means for adjusting the respective phases of said reference component codes until each said reference component code correlates with said transmitted signal.

14. A system of the character recited in claim 2 in which said acquisition means comprises means for adjusting the phase of the one of said reference component codes corresponding to said one of said acquisition component codes until said reference component code correlates with said transmitted signal, means for combining said reference component codes in accordance with composition rules for generating a plurality of reference composite codes each correlating with said acquisition composite code only when said reference component codes of which it is composed are in alignment with the corresponding acquisition component codes in said acquisition composite code, and means for adjusting the respective phases of the remaining of said reference component codes until each said reference composite code correlates with said transmitted signal.

15. A system of the character recited in claim 2 in which said acquisition and reference component codes comprise binary state codes respectively and said acquisition means comprises means for adjusting the phase of the one of said reference component codes corresponding to said one of said acquisition component codes until said one reference component code correlates with said transmitted signal, and means for adjusting the respective phases of the remaining of said reference component codes until the modulo-2 sum of each said remaining reference component codes and said one reference component code correlates with said transmitted signal, respectively.

16. A data communication system comprising:
a data transmitting system including component code generation means for providing acquisition component code signals, composite code generation means responsive to said acquisition component code signals for providing an acquisition composite code signal composed therefrom in accordance with a first composition rule whereby at least one of said acquisition component codes correlates with said acquisition composite code and a transmitter means for transmitting said acquisition composite code signal; and a data receiving system including reference component code generation means for providing reference component codes that correlate with said acquisition component codes respectively, acquisition means responsive to said reference component codes and said transmitted signal for acquiring said transmitted signal with respect to each of said reference component codes thereby acquiring said transmitted signal in accordance with said acquisition composite code, verification code generation means responsive to said reference component codes for providing a verification composite code signal composed therefrom in accordance with a second composition rule of such a character that said verification composite code correlates with said acquisition composite code only when all of said reference component codes are aligned to correlate respectively with the corresponding acquisition component codes in said acquisition composite code, and correlator means responsive to said verification composite code signal and said acquired transmitted signal for obtaining the cross-correlation therebetween, thereby providing a verification signal representative of the successful acquisition of said transmitted acquisition composite code signal.

17. A data communication system of the character recited in claim 16 in which said reference component codes have identical code patterns to those of said acquisition component codes, respectively.

18. A data communication system of the character recited in claim 16 in which said data transmitting system further includes means for modulating said acquisition composite code signal with a data signal, and said data receiving system further includes means for tracking said acquired transmitted signal with said verification composite signal when said verification signal manifests the successful acquisition of said transmitted acquisition composite code signal and means for demodulating said modulated acquisition composite code signal for obtaining said data signal.

19. A data communication system of the character recited in claim 16 in which said composite code generation means includes means for selectively providing said acquisition composite code signal and a carrier composite code signal that correlates with a code composed from said acquisition component codes in accordance with said second composition rule, said data transmitting system further includes means for modulating said carrier composite code signal with a data signal and means for transmitting said selected composite code signal, and said data receiving system further includes means for tracking said transmitted composite code signal with said verification composite code signal when said verification signal manifests the successful acquisition of said transmitted acquisition composite code signal and means for demodulating said modulated carrier composite code signal for obtaining said data signal.

20. A data communication system of the character recited in claim 19 in which said composite code generation means includes means for selecting said acquisition composite code signal for transmission until said verification signal manifests the successful acquisition thereof and means for selecting said carrier composite code signal for transmission thereafter, and in which said carrier composite code signal is compared from said acquisition component codes in accordance with said second composition rule.

21. A data communication system of the character recited in claim 20 in which said acquisition and reference component codes comprise binary state codes respectively, said composite code generation means includes means for providing said carrier composite code signal in accordance with a modulo-2 addition rule whereby said carrier composite code comprises the modulo-2 sum of said acquisition component codes, and said verification code generation means comprises means for providing said verification composite code signal in accordance with said modulo-2 addition rule whereby said verification composite code comprises the modulo-2 sum of said reference component codes.

22. A data communication system of the character recited in claim 21 in which said acquisition component codes have respective cyclic code lengths relatively prime with respect to each other, each said reference component code has the same cyclic code length as the acquisition component code corresponding thereto, said acquisition and reference component codes are pseudo-random codes having respective auto-correlation functions with sidelobes of small magnitude compared to the magnitudes of the respective correlation peaks, and said acquisition and reference component codes each have about equal numbers of binary ONES and binary ZEROES.

23. A system of the character recited in claim 4 in which said acquisition component codes and said reference component codes have respective auto-correlation functions with sidelobes of small magnitude compared to the magnitudes of the respective correlation peaks.

* * * * *